(12) United States Patent
Han et al.

(10) Patent No.: US 10,661,836 B2
(45) Date of Patent: May 26, 2020

(54) MOUNTING UNIT

(71) Applicants: Hyundai Motor Company, Seoul (KR); Kia Motors Corporation, Seoul (KR); Sungwoo Hitech Co., Ltd., Busan (KR)

(72) Inventors: Min Uke Han, Gyeonggi-do (KR); Mun Yong Lee, Busan (KR); Ki Sung Nam, Gyeongsangnam-do (KR)

(73) Assignees: Hyundai Motor Company, Seoul (KR); Kia Motors Corporation, Seoul (KR); Sungwoo Hitech Co., Ltd., Busan (KR)

( * ) Notice: Subject to any disclaimer, the term of this patent is extended or adjusted under 35 U.S.C. 154(b) by 57 days.

(21) Appl. No.: 16/102,567

(22) Filed: Aug. 13, 2018

(65) Prior Publication Data

US 2019/0176890 A1 Jun. 13, 2019

(30) Foreign Application Priority Data

Dec. 8, 2017 (KR) .......................... 10-2017-0168215

(51) Int. Cl.
*B62D 24/00* (2006.01)

(52) U.S. Cl.
CPC .................... *B62D 24/00* (2013.01)

(58) Field of Classification Search
CPC ........ B62D 21/02; B62D 21/09; B62D 21/11; B62D 24/00; B62D 24/02; B62D 25/20; B62D 33/02; B62D 33/077
USPC ...................... 296/193.07, 204, 35.3, 29, 30
See application file for complete search history.

(56) References Cited

U.S. PATENT DOCUMENTS

| 6,349,953 | B1 * | 2/2002 | Yoshihira | B60G 7/02 280/124.109 |
| 8,567,850 | B2 * | 10/2013 | Honda | E02F 9/0816 180/89.13 |
| 9,994,262 | B1 * | 6/2018 | Kube | B62D 29/008 |
| 2005/0040670 | A1 * | 2/2005 | Kikuchi | B60P 7/0815 296/183.1 |
| 2006/0196752 | A1 * | 9/2006 | Kilby | B62D 24/02 193/41 |
| 2012/0313399 | A1 * | 12/2012 | Caliskan | B62D 25/20 296/193.01 |
| 2013/0168989 | A1 * | 7/2013 | Sasage | B62D 24/02 296/35.1 |
| 2015/0375802 | A1 * | 12/2015 | Courtright | B62D 25/2027 296/183.1 |
| 2015/0375805 | A1 * | 12/2015 | Courtright | B62D 33/077 296/184.1 |

(Continued)

*Primary Examiner* — Gregory A Blakenship
(74) *Attorney, Agent, or Firm* — Mintz Levin Cohn Ferris Glovsky and Popeo, P.C.; Peter F. Corless

(57) ABSTRACT

A mounting unit is provided that improves compatibility to be applied to various parts of a vehicle body which is coupled with a chassis by manufacturing the mounting unit to include a bracket and hardware. The mounting unit includes a bracket that has a first panel and a second panel, which are respectively bent several times, are combined with each other to form an empty portion to be surrounded by the first panel and the second panel and fixed to a vehicle body. Additionally, the mounting unit includes a hardware that is disposed in the empty portion to be fixed by being combined with the first panel and the second panel and adapted to form a thread for engaging a fastening mechanism.

15 Claims, 6 Drawing Sheets

(56) References Cited

U.S. PATENT DOCUMENTS

| | | | |
|---|---|---|---|
| 2015/0375807 A1* | 12/2015 | Courtright | B62D 29/008 |
| | | | 296/184.1 |
| 2015/0375808 A1* | 12/2015 | Ganti | B62D 33/077 |
| | | | 296/35.1 |
| 2017/0043729 A1* | 2/2017 | Courtright | B62D 33/02 |
| 2017/0233016 A1* | 8/2017 | Courtright | B62D 29/007 |
| | | | 296/183.1 |
| 2018/0237075 A1* | 8/2018 | Kawabe | B60L 50/66 |
| 2019/0176890 A1* | 6/2019 | Han | B62D 24/00 |

* cited by examiner

MOUNTING UNIT

CROSS-REFERENCE TO RELATED APPLICATION

This application claims priority to and the benefit of Korean Patent Application No. 10-2017-0168215 filed on Dec. 8, 2017, the entire contents of which are incorporated herein by reference.

BACKGROUND

(a) Field of the Invention

The present invention relates to a mounting unit, and more particularly, to a mounting unit which is provided to a vehicle body for coupling a chassis with a vehicle body.

(b) Description of the Related Art

Generally, an additional mounting unit is required for coupling a chassis such as a sub-frame to a vehicle body. A conventional mounting unit includes a bracket and a bolt which is fixed to the bracket by welding. However, a process for providing the mounting unit to a vehicle body may become complex as manufacturing of an ordinary mounting unit includes forming each of the brackets and the bolt, welding of the bracket and the bolt, and so on. In addition, the manufacture of the mounting unit may not be advantageous for reduction of weight of a vehicle. Further, according to a conventional mounting unit, appearance design may be deteriorated by thermal deformation while welding.

The above information disclosed in this section is merely for enhancement of understanding of the background of the invention and therefore it may contain information that does not form the prior art that is already known in this country to a person of ordinary skill in the art.

SUMMARY

The present invention provides a mounting unit having the advantages of improving compatibility to be applied to various parts of a vehicle body which is coupled with a chassis by manufacturing the mounting unit to include a bracket and hardware.

A mounting unit according to an exemplary embodiment of the present invention may be a mounting unit provided to a vehicle body for coupling a chassis with a vehicle body. The mounting unit according to an exemplary embodiment of the present invention may include: a bracket having a first panel and a second panel, which are respectively bent several times, combined with each other to form an empty portion to be surrounded by the first panel and the second panel and fixed to a vehicle body; and a hardware disposed in the empty portion to be fixed by being combined with the first panel and the second panel and adapted to form a screw thread for engaging a bolt.

The first panel may include: a bracket upper plate which is an upper plate of the bracket; a bracket first side plate bent from a first end of the bracket upper plate and extended downwardly; a first side plate combining end which is an end of the bracket first side plate extended downwardly; and an upper plate combining end bent from a second end of the bracket upper plate and extended upwardly. The second panel may include: a bracket lower plate disposed in parallel with and apart from the bracket upper plate; a lower plate combining end bent from a first end of the bracket lower plate and extended downwardly, and contacted to and welded with an interior surface of the first side plate combining end; a bracket second side plate bent from a second end of the bracket lower plate and extended upwardly to be disposed in parallel with and apart from the bracket first side plate; and a second side plate combining end, which is an end of the bracket other side plate extended upwardly, contacted to and welded with an exterior surface of the upper plate combining end.

Further, the first panel may include: a bracket upper plate which is an upper plate of the bracket; a bracket first side upper plate bent from a first end of the bracket upper plate and extended downwardly; a first side upper plate combining end bent from an end of the bracket first side upper plate extended downwardly and extended toward the exterior; a bracket second side upper plate bent from a second end of the bracket upper plate and extended downwardly; and a second side upper plate combining end bent from an end of the bracket second side upper plate extended downwardly and extended toward the exterior. Additionally, the second panel may include: a bracket lower plate disposed in parallel with and apart from the bracket upper plate; a bracket first side lower plate bent from a first end of the bracket lower plate and extended upwardly to be arranged on a same plane with the bracket first side upper plate; a first side lower plate combining end bent from an end of the bracket first side lower plate extended upwardly and extended toward the exterior, and contacted to and welded with a lower surface of the first side upper plate combining end; a bracket second side lower plate bent from a second end of the bracket lower plate and extended upwardly to be arranged on a same plane with the bracket second side upper plate; and a second side lower plate combining end bent from an end of the bracket second side lower plate extended upwardly and extended toward the exterior, and contacted to and welded with a lower surface of the second side upper plate combining end.

Furthermore, the first panel may include: a bracket upper plate which is an upper plate of the bracket; a bracket first side interior plate bent from a first end of the bracket upper plate and extended downwardly; and a bracket second side interior plate bent from a second end of the bracket upper plate and extended upwardly. The second panel may include: a bracket lower plate disposed in parallel with and apart from the bracket upper plate; a bracket first side exterior plate bent from a first end of the bracket lower plate and extended upwardly; a first side exterior plate combining end, which is an end of the bracket first side exterior plate extended upwardly, contacted to and welded with an exterior surface of the bracket first side interior plate; a bracket second side exterior plate bent from a second end of the bracket lower plate and extended upwardly; and a second side exterior plate combining end, which is an end of the bracket second side exterior plate extended upwardly, contacted to and welded with an exterior surface of the bracket second side interior plate.

The hardware may be formed in a hollow cylindrical shape which is opened at each end thereof, and a welding protrusion may be respectively formed at an upper end and a lower end of the hardware along respective circumferences and the hollow of the hardware may be arranged to correspond with a penetration aperture which is respectively bored at an upper plate of the bracket and a lower plate of the bracket, and may be projection-welded to the upper plate and the lower plate of the bracket using the welding protrusion.

The hardware may be formed in a hollow cylindrical shape which is closed at each end thereof, and a welding protrusion may be formed at a lower end of the hardware along a circumference thereof, the hollow of the hardware may be arranged to correspond with a penetration aperture which is bored at a lower plate of the bracket, and an inserted end having a truncated cone shape may be formed at an upper end of the hardware to be inserted into a penetration aperture which is bored at an upper plate of the bracket, and may be projection-welded to the upper plate and the lower plate of the bracket using the inserted end and the welding protrusion.

The hardware may be formed in a hollow cylindrical shape which is closed at each end thereof, and a welding protrusion may be formed at a lower end of the hardware along a circumference thereof, the hollow of the hardware may be arranged to correspond with a penetration aperture which is bored at a lower plate of the bracket, and a protruded end having a cone shape may be formed at an upper end of the hardware to be inserted into a penetration aperture which is bored at an upper plate of the bracket, and may be projection-welded to the upper plate and the lower plate of the bracket using the protruded end and the welding protrusion.

The screw thread may be formed at an interior circumference of the hardware in the hollow. The empty portion may be formed in a box shape to be surrounded by a cross-section of an "L" shape of the first panel based on the arrangement of the bracket upper plate and the bracket first side plate and a cross-section of an "L" shape of the second panel based on the arrangement of the bracket lower plate and the bracket second side plate. The empty portion may be formed in a box shape to be surrounded by a cross-section of a "U" shape to be upwardly convex of the first panel based on the arrangement of the bracket upper plate, the bracket first side upper plate, and the bracket second side upper plate and a cross-section of a "U" shape to be downwardly convex of the second panel based on the arrangement of the bracket lower plate, the bracket first side lower plate, and the bracket second side lower plate.

Additionally, the empty portion may be formed in a box shape to be surrounded by the bracket upper plate and a cross-section of a "U" shape to be downwardly convex of the second panel based on the arrangement of the bracket lower plate, the bracket first side exterior plate, and the bracket second side exterior plate. The mounting unit may be mounted to a vehicle body in any part of the vehicle body having a cross-section of a box shape to be arranged in the box.

Further effects that can be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
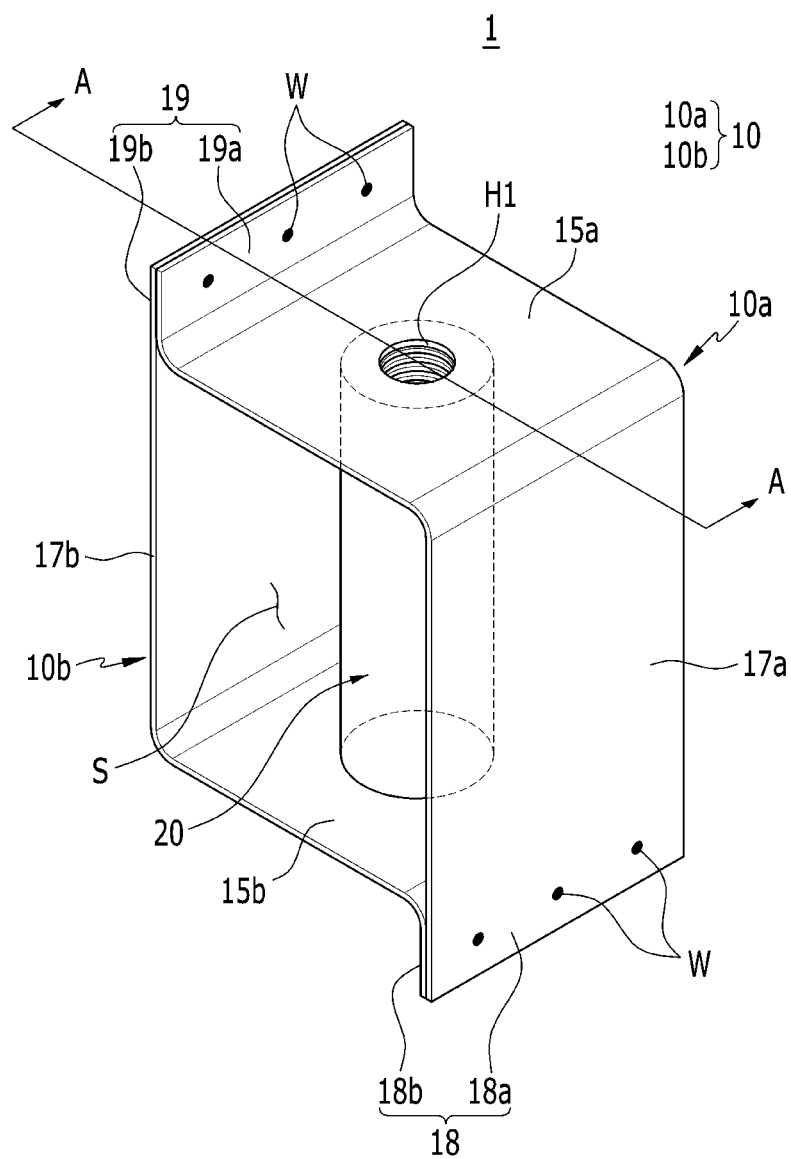
FIG. 1 is a perspective view regarding a first type of structure of a mounting unit according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. The drawings and description are to be regarded as illustrative in nature and not restrictive, and like reference numerals designate like elements throughout the specification. In the following description, dividing names of components into first, second, and the like is to divide the names because the names of the components are the same as each other and an order thereof is not particularly limited.

Figure 2:
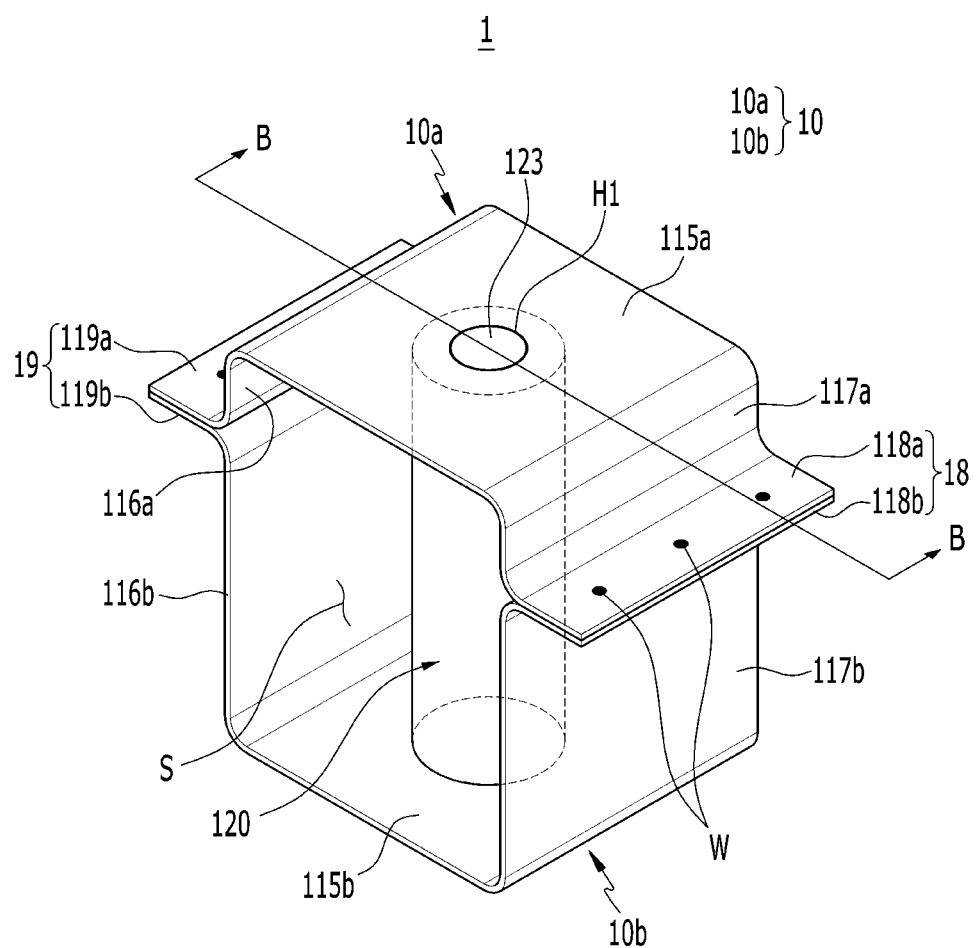
FIG. 2 is a perspective view regarding a second type of structure of a mounting unit according to an exemplary embodiment of the present invention.
Figure 3:
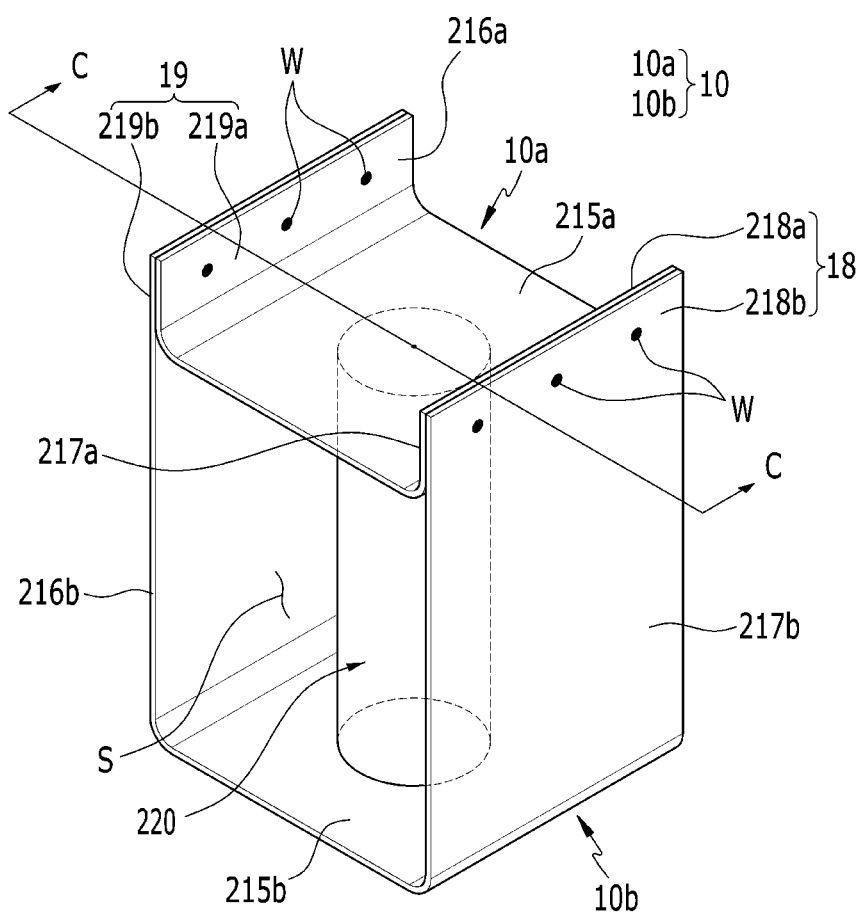
FIG. 3 is a perspective view regarding a third type of structure of a mounting unit according to an exemplary embodiment of the present invention.

FIG. 1 is a perspective view regarding a first type of structure of a mounting unit according to an exemplary embodiment of the present invention, and FIG. 2 is a perspective view regarding a second type of structure of a mounting unit according to an exemplary embodiment of the present invention, and FIG. 3 is a perspective view regarding a third type of structure of a mounting unit according to an exemplary embodiment of the present invention.

As shown in FIG. 1 to FIG. 3, a mounting unit 1 according to an exemplary embodiment of the present invention may include a bracket 10 and a hardware (20, 120, and 220). In addition, the bracket 10 applied to the mounting unit 1 according to an exemplary embodiment of the present invention may include two panels 10a and 10b which are respectively bent several times and are combined with each other. In other words, the bracket 10 may include a first panel 10a and a second panel 10b. Further, a first end of the first panel 10a and a first end of the second panel 10b may be combined and a second end of the first panel 10a and a second end of the second panel 10b may be combined in a state of being respectively bent several times. For convenience of explanation, a portion where the first end of the first panel 10a and the first end of the second panel 10b are combined will be referred to as a "first combining portion 18", and a portion where the second end of the first panel 10a and the second end of the second panel 10b are combined will be referred to as a "second combining portion 19".

The bracket 10 forms an empty portion S (e.g., a void) to be surrounded by the first panel 10a and the second panel 10b based on a bent shape of the first panel 10a and the second panel 10b between the first combining portion 18 and the second combining portion 19, and the hardware (20, 120, and 220) may be disposed in the empty portion S to be fixed to the first panel 10a and the second panel 10b. In addition, the bracket 10 may be of various types based on a bent shape of the first panel 10a and the second panel 10b between the first combining portion 18 and the second combining portion 19. Hereinafter, three types of the structure of the mounting unit 1 according to an exemplary embodiment of the present invention will be described referring FIG. 1 to FIG. 3, but the various types of structures of the mounting unit 1 are not limited thereto. In the following description, an inside direction defines a direction toward a center of the empty portion S and an outside direction defines a direction away from a center of the empty portion S, and an interior surface, an exterior surface, and so on are represented with respect thereto.

Referring to FIG. 1, the first type of structure of the mounting unit 1 according to an exemplary embodiment of the present invention may include the first panel 10a having a bracket upper plate 15a, a bracket first side plate 17a, a first side plate combining end 18a, and an upper plate combining end 19a, and the second panel 10b having a bracket lower plate 15b, a lower plate combining end 18b, a bracket second side plate 17b, and a second side plate combining end 19b.

The bracket upper plate 15a which is horizontally disposed may be an upper plate of the bracket 10, and the first type of structure of the mounting unit 1 will be described for a case that the bracket upper plate 15a is horizontally disposed, for convenience. In particular, the bracket first side plate 17a may be bent from a first end of the bracket upper plate 15a and may extend downwardly. The first side plate combining end 18a is an end of the downwardly extended bracket first side plate 17a. The upper plate combining end 19a may be bent from a second end of the bracket upper plate 15a and may extend upwardly.

Meanwhile, an overall shape of the first panel 10a according to the first type of structure of the mounting unit 1 by the arrangement of the bracket upper plate 15a and the bracket first side plate 17a may be formed to have a cross-section of an "L" shape, and the first panel 10a may form the first side plate combining end 18a and the upper plate combining end 19a on respective ends of the "L" shape cross-section to secure welding portions W.

The bracket lower plate 15b which is horizontally disposed under the bracket upper plate 15a may be a lower plate of the bracket 10. In addition, the bracket lower plate 15b may be disposed in parallel with and apart from the bracket upper plate 15a. In other words, an interior surface of the bracket upper plate 15a faces an interior surface of the bracket lower plate 15b. The lower plate combining end 18b may be bent from a first end of the bracket lower plate 15b and may extend downwardly. In addition, an exterior surface of the lower plate combining end 18b may be contacted to and welded with an interior surface of the first side plate combining end 18a. In this regard, a portion where the lower plate combining end 18b contacts the first side plate combining end 18a is the first combining portion 18.

The bracket second side plate 17b may be bent from a second end of the bracket lower plate 15b and may extend upwardly. In addition, the bracket second side plate 17b may be disposed in parallel with and apart from the bracket first side plate 17a. In other words, an interior surface of the bracket second side plate 17b faces an interior surface of the bracket first side plate 17a. The second side plate combining end 19b is an end of the upwardly extended bracket second side plate 17b. In addition, an interior surface of the second side plate combining end 19b may be contacted to and welded with an exterior surface of the upper plate combining end 19a. In this regard, a portion where the second side plate combining end 19b contacts the upper plate combining end 19a is the second combining portion 19.

Moreover, an overall shape of the second panel 10b according to the first type of structure of the mounting unit 1 by the arrangement of the bracket lower plate 15b and the bracket second side plate 17b may be formed to have a cross-section of an "L" shape, and the second panel 10b forms the lower plate combining end 18b and the second side plate combining end 19b on respective ends of the "L" shape cross-section to secure welding portions W. Further, the first type of structure of the mounting unit 1 may have a cross-section of a box shape which is formed by coupling the "L" shape cross-section of the first panel 10a with the "L" shape cross-section of the second panel 10b. In other words, the empty portion S or the void becomes the box shape space.

Referring to FIG. 2, the second type of structure of the mounting unit 1 according to an exemplary embodiment of the present invention may include the first panel 10a having a bracket upper plate 115a, a bracket first side upper plate 117a, a first side upper plate combining end 118a, a bracket second side upper plate 116a, and a second side upper plate combining end 119a, and the second panel 10b having a bracket lower plate 115b, a bracket first side lower plate 117b, a first side lower plate combining end 118b, a bracket second side lower plate 116b, and a second side lower plate combining end 119b.

The bracket upper plate 115a may be an upper plate of the bracket 10 which is horizontally disposed, and the second type of structure of the mounting unit 1 will be described in the case that the bracket upper plate 115a is horizontally disposed, for convenience. The bracket first side upper plate 117a may be bent from a first end of the bracket upper plate 115a and may extend downwardly. The first side upper plate combining end 118a may be bent from an end of the downwardly extended bracket first side upper plate 117a and may extend toward the exterior. The bracket second side upper plate 116a may be bent from the second end of the bracket upper plate 115a and may extend downwardly. The second side upper plate combining end 119a may be bent from an end of the downwardly extended bracket second side upper plate 116a and may extend toward the exterior.

Moreover, an overall shape of the first panel 10a according to the second type of structure of the mounting unit 1 by the arrangement of the bracket upper plate 115a, the bracket first side upper plate 117a, and the bracket second side upper plate 116a may be formed to have a cross-section of a "U" shape, and the first panel 10a may form the first side upper plate combining end 118a and the second side upper plate combining end 119a on respective ends of the "U" shape cross-section to secure welding portions W.

The bracket lower plate 115b is a lower plate of the bracket 10 which is horizontally disposed under the bracket upper plate 115a. In addition, the bracket lower plate 115b may be disposed apart from and in parallel with the bracket upper plate 115a. In other words, an interior surface of the bracket upper plate 115a faces an interior surface of the bracket lower plate 115b. The bracket first side lower plate 117b may be bent from a first end of the bracket lower plate 115b and may extend upwardly. In addition, the bracket first side lower plate 117b may be disposed on a same plane with the bracket first side upper plate 117a.

Additionally, the first side lower plate combining end 118b may be bent from an end of the upwardly extended bracket first side lower plate 117b and may extend toward the exterior. An upper surface of the first side lower plate combining end 118b may be contacted to and welded with a lower surface of the first side upper plate combining end 118a. In this regard, a portion where the first side lower plate combining end 118b contacts the one side upper plate combining end 118a is the first combining portion 18.

The bracket second side lower plate 116b may be bent from the second end of the bracket lower plate 115b and may extend upwardly. In addition, the bracket second side lower plate 116b may be disposed on a same plane with the bracket second side upper plate 116a. The second side lower plate combining end 119b may be bent from an end of the upwardly extended bracket second side lower plate 116b and may extend toward the exterior.

In addition, an upper surface of the second side lower plate combining end 119b may be contacted to and welded with a lower surface of the second side upper plate combining end 119a. In this regard, a portion where the second side lower plate combining end 119b contacts the second side upper plate combining end 119a is the second combining portion 19.

Moreover, an overall shape of the second panel 10b according to the second type of structure of the mounting unit 1 by the arrangement of the bracket lower plate 115b, the bracket first side lower plate 117b, and the bracket second side lower plate 116b may be formed to have a cross-section of a "U" shape, and the second panel 10b may form the first side lower plate combining end 118b and the second side lower plate combining end 119b on respective ends of the "U" shape cross-section to secure welding portions W. Further, the second type of structure of the mounting unit 1 may have a cross-section of a box shape formed by coupling the "U" shape cross-section to be upwardly convex of the first panel 10a with the "U" shape cross-section to be downwardly convex of the second panel 10b. In other words, the empty portion S or the void becomes a space being formed in the box shape.

Referring to FIG. 3, the third type of structure of the mounting unit 1 according to an exemplary embodiment of the present invention may include the first panel 10a having a bracket upper plate 215a, a bracket first side interior plate 217a, a first side interior plate combining end 218a, a bracket second side interior plate 216a, and a second side interior plate combining end 219a, and the second panel 10b having a bracket lower plate 215b, a bracket first side exterior plate 217b, a first side exterior plate combining end 218b, a bracket second side exterior plate 216b, and a second side exterior plate combining end 219b.

The bracket upper plate 215a may be horizontally disposed to be an upper plate of the bracket 10, and the third type of structure of the mounting unit 1 will be described in the case that the bracket upper plate 215a is horizontally disposed, for convenience. The bracket first side interior plate 217a may be bent from the first end of the bracket upper plate 215a and may extend upwardly. The first side interior plate combining end 218a is an end of the upwardly extended bracket first side interior plate 217a. In addition, the first side interior plate combining end 218a may be the bracket first side interior plate 217a itself. The bracket second side interior plate 216a may be bent from a second end of the bracket upper plate 215a and may extend upwardly. The second side interior plate combining end 219a is an end of the upwardly extended bracket second side interior plate 216a. In addition, the second side interior plate combining end 219a may be the bracket second side interior plate 216a itself.

Moreover, an overall shape of the first panel 10a according to the third type of structure of the mounting unit 1 may be formed to have a cross-section of a "U" shape by the arrangement of the bracket upper plate 215a, the bracket first side interior plate 217a, and the bracket second side interior plate 216a, and the first panel 10a may form the first side interior plate combining end 218a and the second side interior plate combining end 219a on respective ends of the "U" shape cross-section, thereby securing welding portions W.

Furthermore, the bracket lower plate 215b may be horizontally disposed under the bracket upper plate 215a to be a lower plate of the bracket 10. In addition, the bracket lower plate 215b may be disposed apart from and in parallel with the bracket upper plate 215a. In other words, an interior surface of the bracket upper plate 215a faces an interior surface of the bracket lower plate 215b. The bracket first side exterior plate 217b may be bent from the first end of the bracket lower plate 215b and may extend upwardly.

The first side exterior plate combining end 218b is an end of the upwardly extended bracket first side exterior plate 217b. In addition, an interior surface of the first side exterior plate combining end 218b may be contacted to and welded with an exterior surface of the first side interior plate combining end 218a. In this regard, a portion where the first side exterior plate combining end 218b contacts the first side interior plate combining end 218a is the first combining portion 18.

The bracket second side exterior plate 216b may be bent from the second end of the bracket lower plate 115b and may extend upwardly. The second side exterior plate combining end 219b is an end of the upwardly extended bracket second side exterior plate 216b. In addition, an interior surface of the second side exterior plate combining end 219b may be contacted to and welded with an exterior surface of the second side interior plate combining end 219a. In this regard, a portion where the other side exterior plate combining end 219b contacts the second side interior plate combining end 219a is the second combining portion 19.

Moreover, an overall shape of the second panel 10b according to the third type of structure of the mounting unit 1 may be formed to have a cross-section of a "U" shape by the arrangement of the bracket lower plate 215b, the bracket first side exterior plate 217b, and the bracket second side exterior plate 216b, and the second panel 10b may form the first side exterior plate combining end 218b and the second side exterior plate combining end 219b for respectively securing a welding portion W on respective ends of the "U" shape cross-section. Further, the third type of structure of the mounting unit 1 may have a cross-section of a box shape formed by coupling the "U" shape cross-section to be downwardly convex of the first panel 10a with the "U" shape cross-section to be downwardly convex of the second panel 10b. In other words, the empty portion S or the void is a space having the box shape.

The structure of the mounting unit 1 according to the first, second, and third types may be provided to a member of a vehicle body having a box shape cross-section in any part of a vehicle body to be positioned in the box and fixed to the member.

Figure 4:
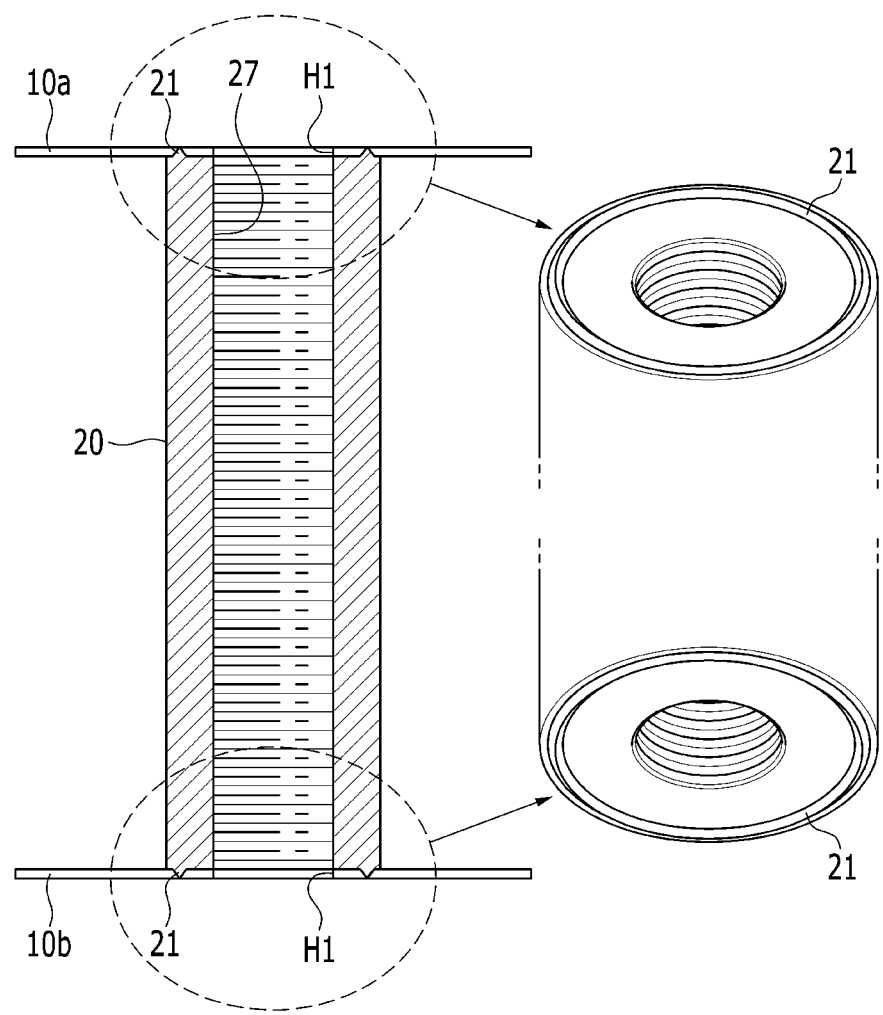
FIG. 4 is a cross-sectional view taken along the line A-A of FIG. 1 for showing a hardware according to one exemplary embodiment of the present invention.
Figure 5:
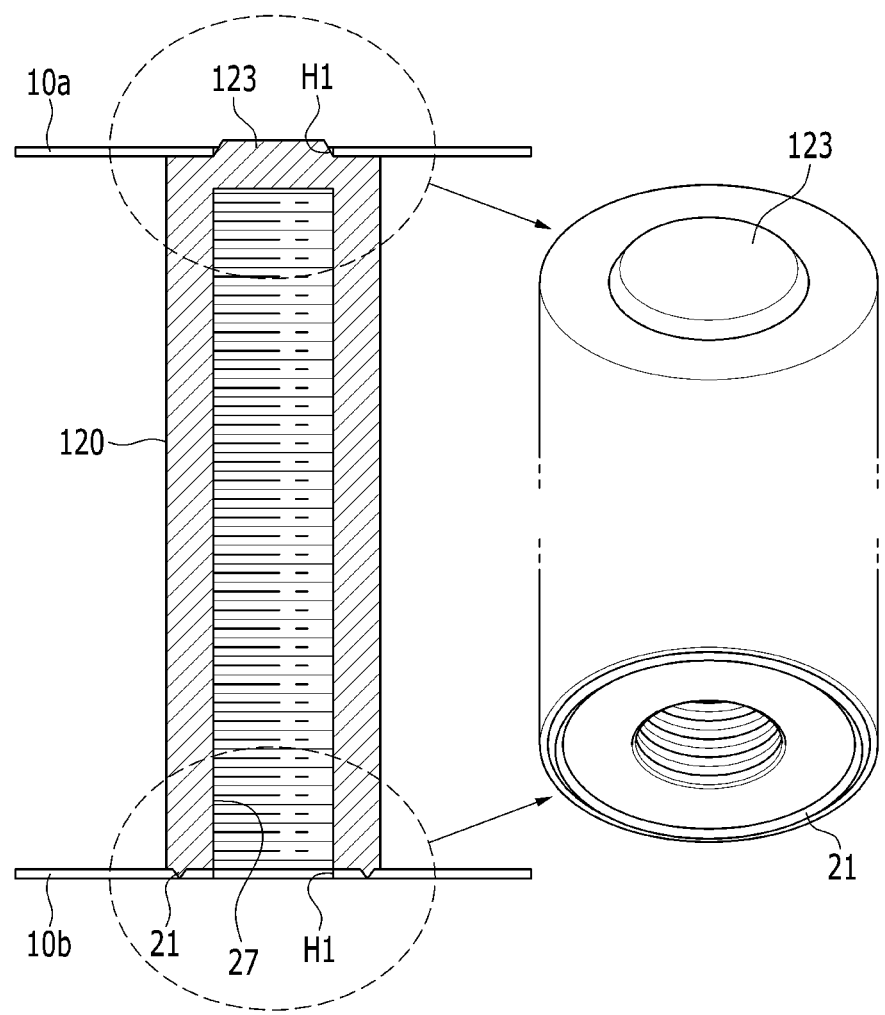
FIG. 5 is a cross-sectional view taken along the line B-B of FIG. 2 for showing a hardware according to the other exemplary embodiment of the present invention.
Figure 6:
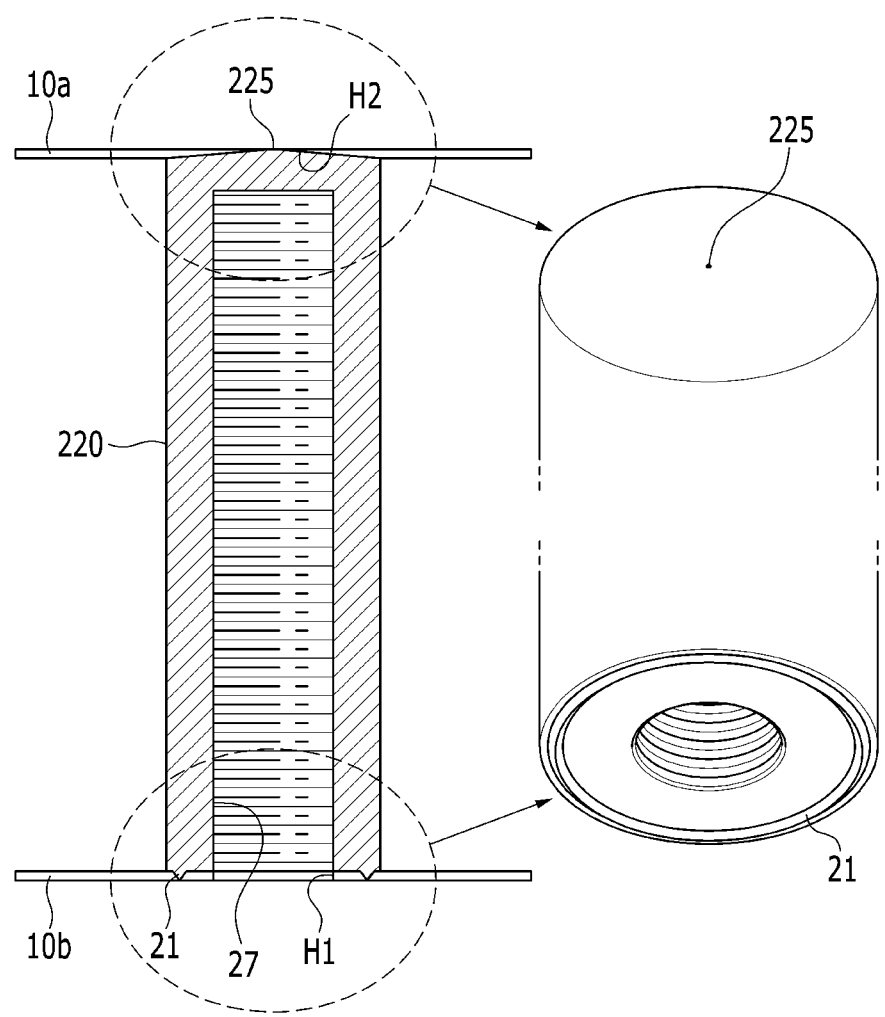
FIG. 6 is a cross-sectional view taken along the line C-C of FIG. 3 for showing a hardware according to still another exemplary embodiment of the present invention.

FIG. 4 is a cross-sectional view taken along the line A-A of FIG. 1 for showing a hardware according to one exemplary embodiment of the present invention, FIG. 5 is a cross-sectional view taken along the line B-B of FIG. 2 for showing a hardware according to the other exemplary embodiment of the present invention, and FIG. 6 is a cross-sectional view taken along the line C-C of FIG. 3 for showing a hardware according to still another exemplary embodiment of the present invention.

The hardware (20, 120, and 220) according to the exemplary embodiments, may be applied to all the structures of the mounting unit 1 according to the first, second, and third types such that an upper end thereof is fixed to the first panel 10a and a lower end thereof is fixed to the second panel 10b in the empty portion S of the bracket 10. For convenience of explanation, the mounting unit 1 applying the hardware 20 according to one exemplary embodiment of the present invention is illustrated in FIG. 1, the mounting unit 1 applying the hardware 120 according to the other exemplary embodiment of the present invention is illustrated in FIG. 2, and the mounting unit 1 applying the hardware 220 according to another exemplary embodiment of the present invention is illustrated in FIG. 3.

Referring to FIG. 1 and FIG. 4, the hardware 20 according to one exemplary embodiment of the present invention may be formed in a hollow cylindrical shape which is open at both ends thereof, and a welding protrusion 21 may be respectively formed at an upper end and a lower end of the hardware 20 along respective circumferences.

The upper end of the hardware 20 may be welded to the interior surface of the bracket upper plate 15a, 115a, and 215a, and the lower end of the hardware 20 may be welded to the interior surface of the bracket lower plate 15b, 115b, and 215b. Further, a hollow 27 (e.g., a hollow portion) of the hardware 20 may be arranged to correspond with a penetration aperture H1 which is respectively bored at the bracket upper plate 15a, 115a, and 215a and the bracket lower plate 15b, 115b, and 215b. In addition, a welding area may increase in size and strength of a weld may be increased by the welding protrusion 21. Further, projection welding may be performed using the welding protrusion 21, and the upper end and the lower end of the hardware 20 may be combined to (e.g., connected to) the bracket 10 by a single procedure when performing the projection welding. A screw thread may be formed at an interior circumference of the hardware 20 in the hollow 27. Therefore, the hardware 20 may be coupled with a chassis by engaging a bolt or other fastening mechanism (not shown) to the hollow 27. In other words, the bolt may be inserted into the hollow portion of the hardware while engaging with the threads formed on the inside of the hollow. In this specification, the mounting unit 1 is used for combining a chassis with the vehicle body, however, the mounting unit 1 may be applied to combine a member such as a seat with the vehicle body depending on design by a person of ordinary skill in the art.

Referring to FIG. 2 and FIG. 5, the hardware 120 according to the other exemplary embodiment of the present invention may be formed in a hollow cylindrical shape having a closed upper end and an open lower end, and the welding protrusion 21 may be formed at a lower end of the hardware 120 along a circumference thereof. In addition, the upper end of the hardware 120 may be welded to the interior surface of the bracket upper plate 15a, 115a, and 215a, and the lower end of the hardware 120 may be welded to the interior surface of the bracket lower plate 15b, 115b, and 215b. Herein, the welding protrusion 21, formed at the lower end of the hardware 120, is the same as the welding protrusion 21 formed at the lower end of the hardware 20 according to the one exemplary embodiment of the present invention, and the hollow 27 of the hardware 120 is the same as the hollow 27 of the hardware 20 according to the one exemplary embodiment of the present invention except for the feature whereby an upper end thereof is closed, thus repeated descriptions will be omitted regarding them.

An inserted end 123 having a truncated cone shape, which protrudes such that a cross-section thereof is to be gradually decreased in an upward direction, may be formed at the upper end of the hardware 120. In addition, the inserted end 123 may be inserted into the penetration aperture H1 bored at the bracket upper plate 15a, 115a, and 215a. Further, the inserted end 123 may be projection-welded to the bracket upper plate 15a, 115a, and 215a when inserted into the penetration aperture H1.

Referring to FIG. 3 and FIG. 6, the hardware 220 according to another exemplary embodiment of the present invention is formed in a hollow cylindrical shape having a closed upper end and an open lower end, and the welding protrusion 21 may be formed at a lower end of the hardware 220 along a circumference thereof. In addition, the upper end of the hardware 220 may be welded to the interior surface of the bracket upper plate 215a, and the lower end of the hardware 220 may be welded to the interior surface of the bracket lower plate 215b. Herein, the welding protrusion 21, formed at the lower end of the hardware 220, is the same as the welding protrusion 21 formed at the lower end of the hardware 20 according to the one exemplary embodiment of the present invention, and the hollow 27 of the hardware 220 is the same as hollow 27 of the hardware 20 according to the one exemplary embodiment of the present invention except for the feature whereby an upper end thereof is closed, thus repeated descriptions will be omitted regarding them.

A protruded end 225 having a cone shape, that protrudes such that a cross-section thereof is gradually decreased in an upward direction, may be formed at the upper end of the hardware 220. In addition, the protruded end 225 may be inserted into the penetration aperture H1 (e.g., first penetration aperture) bored at the bracket upper plate 15a, 115a, and 215a. Further, the protruded end 225 may be projection-welded to the bracket upper plate 15a, 115a, and 215a when inserted into the penetration aperture H1. In this regard, the penetration aperture H2 (e.g., second penetration aperture) bored at the bracket upper plate 15a, 115a, and 215a may be transformed to have a shape of being gradually decreased in an upward direction and to correspond with the protruded end 225.

According to exemplary embodiments of the present invention, since the mounting unit 1 may be mounted into an interior space of the box at any part of a vehicle body having the box shape cross-section and then may be coupled with a chassis after being manufactured, the hardware (20, 120, and 220) may be combined to the bracket 10, and thus, the mounting unit 1 may be shared irrespective of the vehicle type and chassis type.

In addition, welding quality may be ensured, and simultaneously a process may be simplified, thereby improving the productivity as the hardware (20, 120, and 220) is projection-welded to the bracket 10. Further, since the hardware (20, 120, and 220) may be combined to the bracket upper plate (15*a*, 115*a*, and 215*a*) and the bracket lower plate (15*b*, 115*b*, and 215*b*), structural rigidity may be increased. Furthermore, welding surfaces for improving welding effect may be secured by processing both the upper end and the lower end of the hardware (20, 120, and 220).

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A mounting unit for coupling a vehicle body with a chassis, comprising:
    a bracket having a first panel and a second panel, which are respectively bent several times, are combined with each other to form an empty portion to be surrounded by the first panel and the second panel and fixed to a vehicle body; and
    a hardware disposed in the empty portion to be fixed by being combined with the first panel and the second panel and adapted to form a thread for engaging a fastening mechanism,
    wherein the first panel includes:
        a bracket upper plate which is an upper plate of the bracket;
        a bracket first side plate bent from a first end of the bracket upper plate and extended downwardly;
        a first side plate combining end which is an end of the bracket first side plate extended downwardly; and
        an upper plate combining end bent from a second end of the bracket upper plate and extended upwardly, and
    wherein the second panel includes:
        a bracket lower plate disposed in parallel with and apart from the bracket upper plate;
        a lower plate combining end bent from a first end of the bracket lower plate and extended downwardly, and contacted to and welded with an interior surface of the first side plate combining end;
        a bracket second side plate bent from a second end of the bracket lower plate and extended upwardly to be disposed in parallel with and apart from the bracket first side plate; and
        a second side plate combining end, which is an end of the bracket second side plate extended upwardly, contacted to and welded with an exterior surface of the upper plate combining end.

2. The mounting unit of claim 1, wherein the hardware is formed in a hollow cylindrical shape which is opened at both ends thereof, and includes a welding protrusion formed respectively at an upper end and a lower end of the hardware along respective circumferences and the hollow of the hardware is arranged to correspond with a penetration aperture which is respectively bored at an upper plate of the bracket and a lower plate of the bracket, and is projection-welded to the upper plate and the lower plate of the bracket using the welding protrusion and wherein the thread is formed at an interior circumference of the hardware in the hollow.

3. The mounting unit of claim 1, wherein the hardware is formed in a hollow cylindrical shape having a closed upper end and an open lower end, and includes a welding protrusion formed at the open lower end of the hardware along a circumference thereof, the hollow of the hardware is arranged to correspond with a first penetration aperture which is bored at a lower plate of the bracket, and an inserted end having a truncated cone shape is formed at the closed upper end of the hardware to be inserted into a second penetration aperture which is bored at an upper plate of the bracket, and is projection-welded to the upper plate and the lower plate of the bracket using the inserted end and the welding protrusion, and wherein the thread is formed at an interior circumference of the hardware in the hollow.

4. The mounting unit of claim 1, wherein the hardware is formed in a hollow cylindrical shape having a closed upper end and an open lower end, and includes a welding protrusion formed at the open lower end of the hardware along a circumference thereof, the hollow of the hardware is arranged to correspond with a first penetration aperture which is bored at a lower plate of the bracket, and a protruded end having a cone shape is formed at the closed upper end of the hardware to be inserted into a second penetration aperture which is bored at an upper plate of the bracket, and is projection-welded to the upper plate and the lower plate of the bracket using the protruded end and the welding protrusion, and wherein the thread is formed at an interior circumference of the hardware in the hollow.

5. The mounting unit of claim 1, wherein the empty portion is formed in a box shape to be surrounded by an L-shaped cross-section of the first panel based on the arrangement of the bracket upper plate and the bracket first side plate and an L-shaped cross-section of the second panel based on the arrangement of the bracket lower plate and the bracket second side plate.

6. A mounting unit for coupling a vehicle body with a chassis, comprising:
    a bracket having a first panel and a second panel, which are respectively bent several times, are combined with each other to form an empty portion to be surrounded by the first panel and the second panel and fixed to a vehicle body; and
    a hardware disposed in the empty portion to be fixed by being combined with the first panel and the second panel and adapted to form a thread for engaging a fastening mechanism, wherein the first panel includes:
        a bracket upper plate which is an upper plate of the bracket;
        a bracket first side upper plate bent from a first end of the bracket upper plate and extended downwardly;
        a first side upper plate combining end bent from an end of the bracket first side upper plate extended downwardly and extended toward the exterior;
        a bracket second side upper plate bent from a second end of the bracket upper plate and extended downwardly; and
        a second side upper plate combining end bent from an end of the bracket second side upper plate extended downwardly and extended toward the exterior, and
    wherein the second panel includes:
        a bracket lower plate disposed in parallel with and apart from the bracket upper plate;

a bracket first side lower plate bent from a first end of the bracket lower plate and extended upwardly to be arranged on a same plane with the bracket first side upper plate;

a first side lower plate combining end bent from an end of the bracket first side lower plate extended upwardly and extended toward the exterior, and contacted to and welded with a lower surface of the first side upper plate combining end;

a bracket second side lower plate bent from a second end of the bracket lower plate and extended upwardly to be arranged on a same plane with the bracket second side upper plate; and a second side lower plate combining end bent from an end of the bracket second side lower plate extended upwardly and extended toward the exterior, and contacted to and welded with a lower surface of the second side upper plate combining end.

7. The mounting unit of claim 6, wherein the empty portion is formed in a box shape to be surrounded by a U-shaped cross-section to be upwardly convex of the first panel based on the arrangement of the bracket upper plate, the bracket first side upper plate, and the bracket second side upper plate and a U-shaped cross-section to be downwardly convex of the second panel based on the arrangement of the bracket lower plate, the bracket first side lower plate, and the bracket second side lower plate.

8. The mounting unit of claim 6, wherein the hardware is formed in a hollow cylindrical shape which is opened at both ends thereof, and includes a welding protrusion formed respectively formed at an upper end and a lower end of the hardware along respective circumferences and the hollow of the hardware is arranged to correspond with a penetration aperture which is respectively bored at an upper plate of the bracket and a lower plate of the bracket, and is projection-welded to the upper plate and the lower plate of the bracket using the welding protrusion, and wherein the thread is formed at an interior circumference of the hardware in the hollow.

9. The mounting unit of claim 6, wherein the hardware is formed in a hollow cylindrical shape having a closed upper end and an open lower end, and includes a welding protrusion formed at the open lower end of the hardware along a circumference thereof, the hollow of the hardware is arranged to correspond with a first penetration aperture which is bored at a lower plate of the bracket, and an inserted end having a truncated cone shape is formed at the closed upper end of the hardware to be inserted into a second penetration aperture which is bored at an upper plate of the bracket, and is projection-welded to the upper plate and the lower plate of the bracket using the inserted end and the welding protrusion, and wherein the thread is formed at an interior circumference of the hardware in the hollow.

10. The mounting unit of claim 6, wherein the hardware is formed in a hollow cylindrical shape having a closed upper end and an open lower end, and includes a welding protrusion formed at the open lower end of the hardware along a circumference thereof, the hollow of the hardware is arranged to correspond with a first penetration aperture which is bored at a lower plate of the bracket, and a protruded end having a cone shape is formed at the closed upper end of the hardware to be inserted into a second penetration aperture which is bored at an upper plate of the bracket, and is projection-welded to the upper plate and the lower plate of the bracket using the protruded end and the welding protrusion, and wherein the thread is formed at an interior circumference of the hardware in the hollow.

11. A mounting unit for coupling a vehicle body with a chassis, comprising:

a bracket having a first panel and a second panel, which are respectively bent several times, are combined with each other to form an empty portion to be surrounded by the first panel and the second panel and fixed to a vehicle body; and a hardware disposed in the empty portion to be fixed by being combined with the first panel and the second panel and adapted to form a thread for engaging a fastening mechanism, wherein the first panel includes:

a bracket upper plate which is an upper plate of the bracket;

a bracket first side interior plate bent from a first end of the bracket upper plate and extended downwardly; and a bracket second side interior plate bent from a second end of the bracket upper plate and extended upwardly, and wherein the second panel includes:

a bracket lower plate disposed in parallel with and apart from the bracket upper plate;

a bracket first side exterior plate bent from a first end of the bracket lower plate and extended upwardly;

a first side exterior plate combining end, which is an end of the bracket first side exterior plate extended upwardly, contacted to and welded with an exterior surface of the bracket first side interior plate;

a bracket second side exterior plate bent from a second end of the bracket lower plate and extended upwardly; and a second side exterior plate combining end, which is an end of the bracket second side exterior plate extended upwardly, contacted to and welded with an exterior surface of the bracket second side interior plate.

12. The mounting unit of claim 11, wherein the empty portion is formed in a box shape to be surrounded by the bracket upper plate and a U-shaped cross-section to be downwardly convex of the second panel based on the arrangement of the bracket lower plate, the bracket first side exterior plate, and the bracket second side exterior plate.

13. The mounting unit of claim 11, wherein the hardware is formed in a hollow cylindrical shape which is opened at both ends thereof, and includes a welding protrusion formed respectively formed at an upper end and a lower end of the hardware along respective circumferences and the hollow of the hardware is arranged to correspond with a penetration aperture which is respectively bored at an upper plate of the bracket and a lower plate of the bracket, and is projection-welded to the upper plate and the lower plate of the bracket using the welding protrusion, and wherein the thread is formed at an interior circumference of the hardware in the hollow.

14. The mounting unit of claim 11, wherein the hardware is formed in a hollow cylindrical shape having a closed upper end and an open lower end, and includes a welding protrusion formed at the open lower end of the hardware along a circumference thereof, the hollow of the hardware is arranged to correspond with a first penetration aperture which is bored at a lower plate of the bracket, and an inserted end having a truncated cone shape is formed at the closed upper end of the hardware to be inserted into a second penetration aperture which is bored at an upper plate of the bracket, and is projection-welded to the upper plate and the lower plate of the bracket using the inserted end and the welding protrusion, and wherein the thread is formed at an interior circumference of the hardware in the hollow.

15. The mounting unit of claim 11, wherein the hardware is formed in a hollow cylindrical shape having a closed upper end and an open lower end, and includes a welding protrusion formed at the open lower end of the hardware along a circumference thereof, the hollow of the hardware is arranged to correspond with a first penetration aperture which is bored at a lower plate of the bracket, and a protruded end having a cone shape is formed at the closed upper end of the hardware to be inserted into a second penetration aperture which is bored at an upper plate of the bracket, and is projection-welded to the upper plate and the lower plate of the bracket using the protruded end and the welding protrusion, and wherein the thread is formed at an interior circumference of the hardware in the hollow.

\* \* \* \* \*